US008422564B2

(12) United States Patent
Kim et al.

(10) Patent No.: US 8,422,564 B2
(45) Date of Patent: Apr. 16, 2013

(54) METHOD AND APPARATUS FOR TRANSMITTING/RECEIVING ENHANCED MEDIA DATA IN DIGITAL MULTIMEDIA BROADCASTING SYSTEM

(75) Inventors: Kwang-Yong Kim, Daejeon (KR); Gwang Soon Lee, Daejeon (KR); Joungil Yun, Daejeon (KR); Seomee Choi, Daejeon (KR); Jong Soo Lim, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 243 days.

(21) Appl. No.: 12/747,442

(22) PCT Filed: Oct. 7, 2008

(86) PCT No.: PCT/KR2008/005879
§ 371 (c)(1),
(2), (4) Date: Jun. 10, 2010

(87) PCT Pub. No.: WO2009/075466
PCT Pub. Date: Jun. 18, 2009

(65) Prior Publication Data
US 2010/0266052 A1    Oct. 21, 2010

(30) Foreign Application Priority Data
Dec. 10, 2007 (KR) .......... 10-2007-0127383

(51) Int. Cl.
*H04N 7/26* (2006.01)
(52) U.S. Cl.
USPC ............... 375/240.28; 375/240.26
(58) Field of Classification Search ............. 375/240.26, 375/240.28
See application file for complete search history.

(56) References Cited

U.S. PATENT DOCUMENTS

| | | | |
|---|---|---|---|
| 5,886,736 A * | 3/1999 | Chen | 348/43 |
| 6,188,684 B1 * | 2/2001 | Setoyama et al. | 370/352 |
| 6,480,541 B1 * | 11/2002 | Girod et al. | 375/240.12 |
| 6,968,005 B2 * | 11/2005 | Hannuksela | 375/240.01 |
| 7,133,449 B2 | 11/2006 | Chen | |
| 2002/0116473 A1 * | 8/2002 | Gemmell | 709/219 |
| 2006/0098937 A1 | 5/2006 | Bruls et al. | |
| 2009/0003462 A1 * | 1/2009 | Chen | 375/240.28 |

OTHER PUBLICATIONS

Basso, A. et al., "Transport of MPEG-4 over IP/RTP," IEEE International Conference on Multimedia and Expo., vol. 2:1067-1070 (2000).

(Continued)

*Primary Examiner* — Sath V Perungavoor
*Assistant Examiner* — Jeffery Williams
(74) *Attorney, Agent, or Firm* — Nelson Mullins Riley & Scarborough LLP; EuiHoon Lee, Esq.

(57) ABSTRACT

A method and apparatus for processing enhanced media data in a Digital Multimedia Broadcasting (DMB) system is provided. The apparatus for processing enhanced media data includes: a base layer processing unit configured to multiplex an elementary stream of a base layer and perform channel encoding for the multiplexed elementary stream of the base layer; an enhancement layer processing unit configured to synchronize an elementary stream of an enhancement layer with the elementary stream of the base layer and thereby multiplex the elementary stream of the enhancement layer and process the elementary stream of the enhancement layer to be transmittable via at least one of a plurality of transmission channels; and a synchronizer configured to provide the enhancement layer processing unit with synchronization information that is used for synchronizing the elementary stream of the enhancement layer with the elementary stream of the base layer.

16 Claims, 5 Drawing Sheets

OTHER PUBLICATIONS

Eleftheriadis, Alexandros et al., "International Organisation for Standardisation, Organisation Internationale de Normalisation, ISO/IEC JTC1/SC29/WG11, Coding of Moving Pictures and Audio," MPEG-4 Systems (1998).

Lee, D. et al., "The MPEG-4 Streaming Player Using Adaptive Decoding Time Stamp Synchronization," Proceedings of the Ninth International Conference on Parallel and Distributed Systems (ICPADS'02) (2002).

* cited by examiner

[Fig. 1]
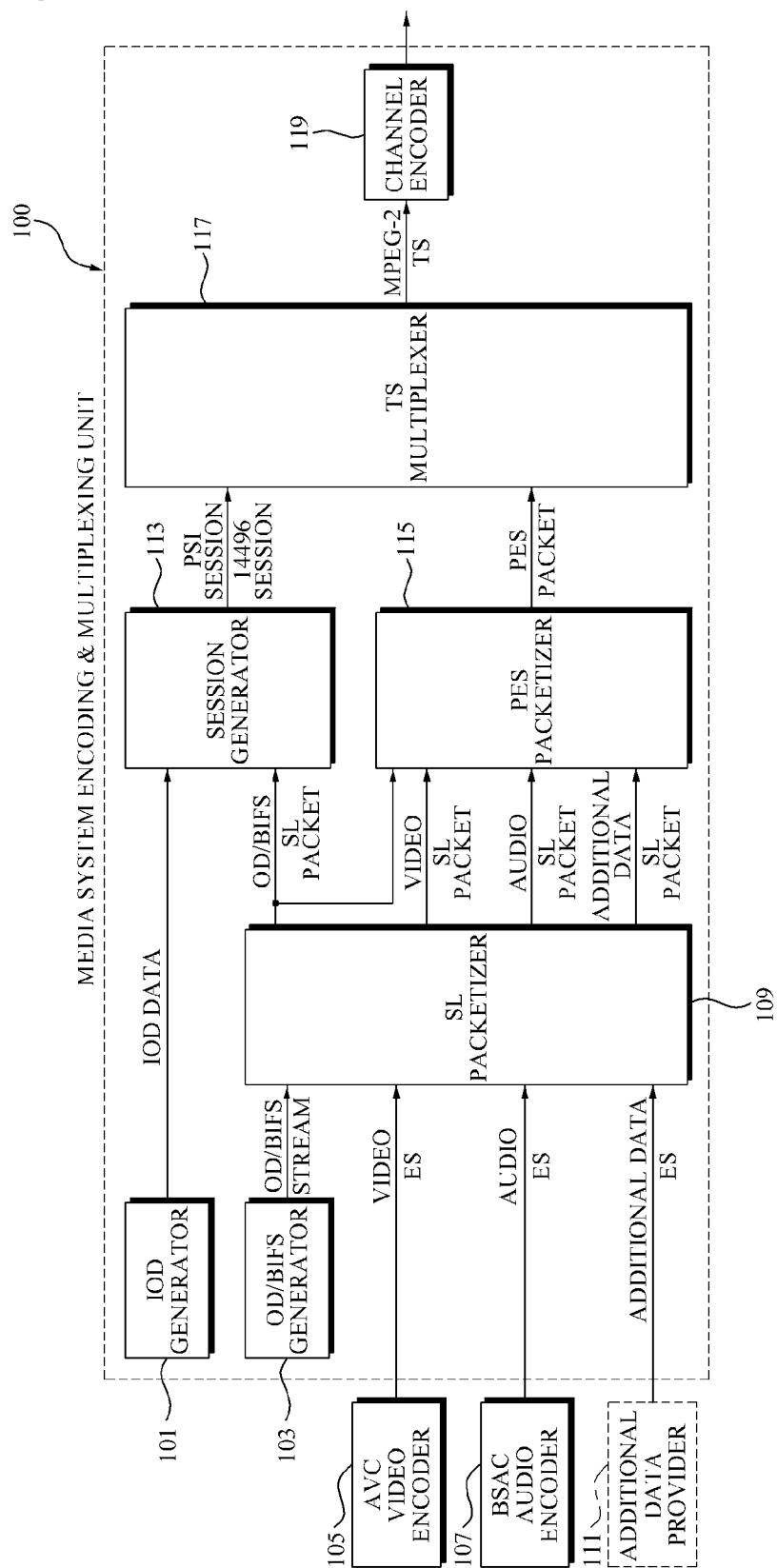

[Fig. 2]
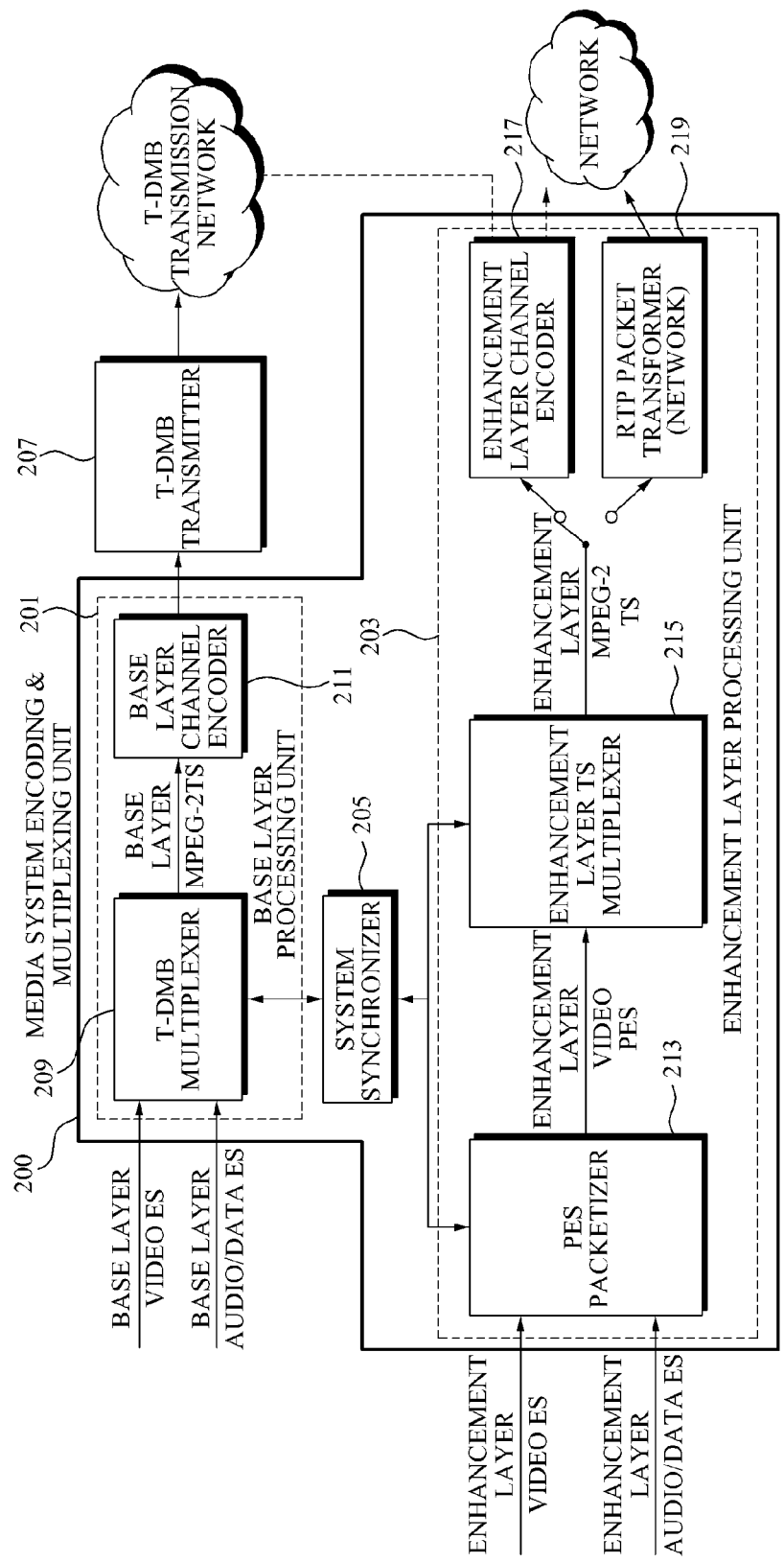

[Fig. 3]
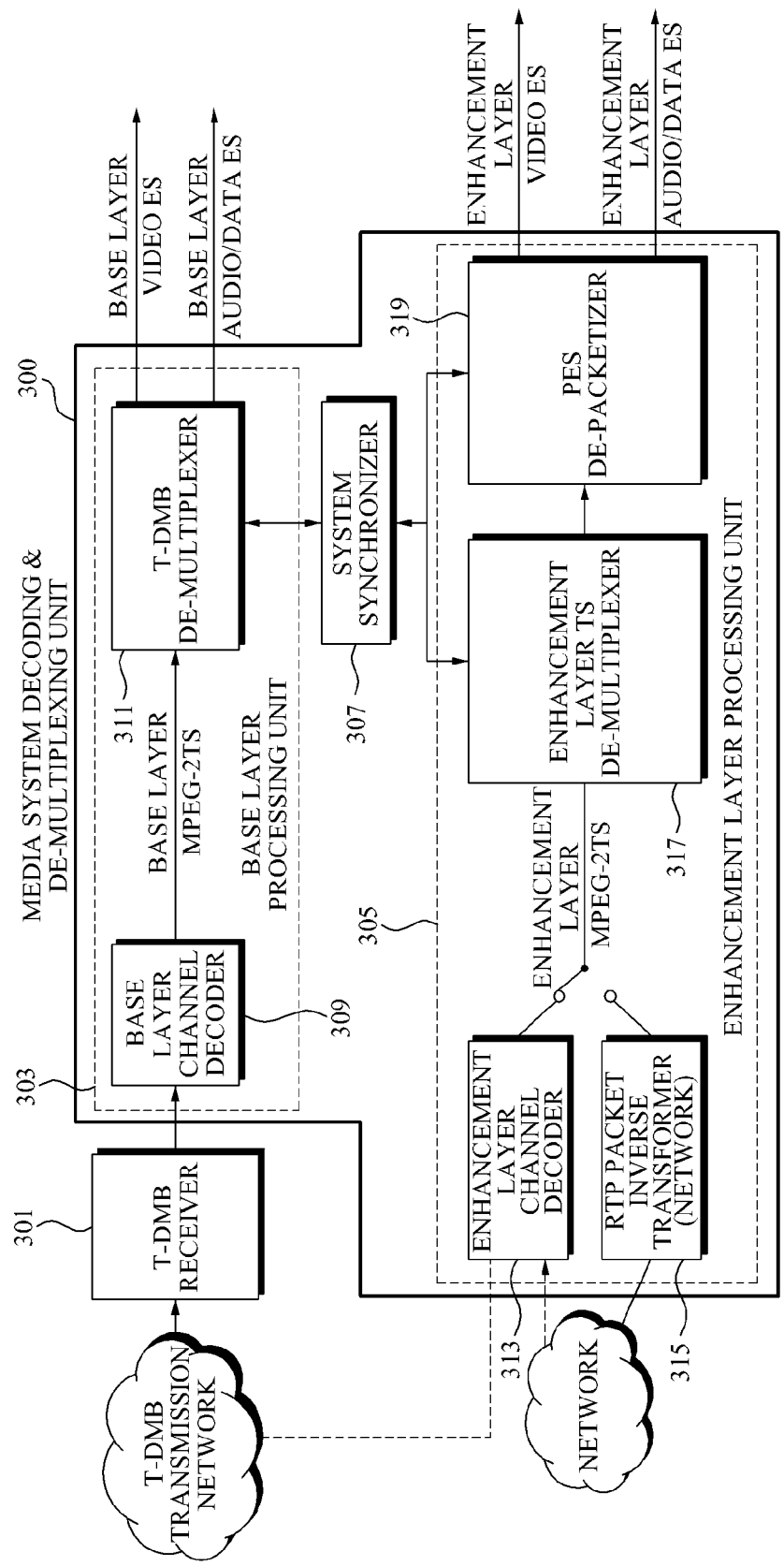

[Fig. 4]
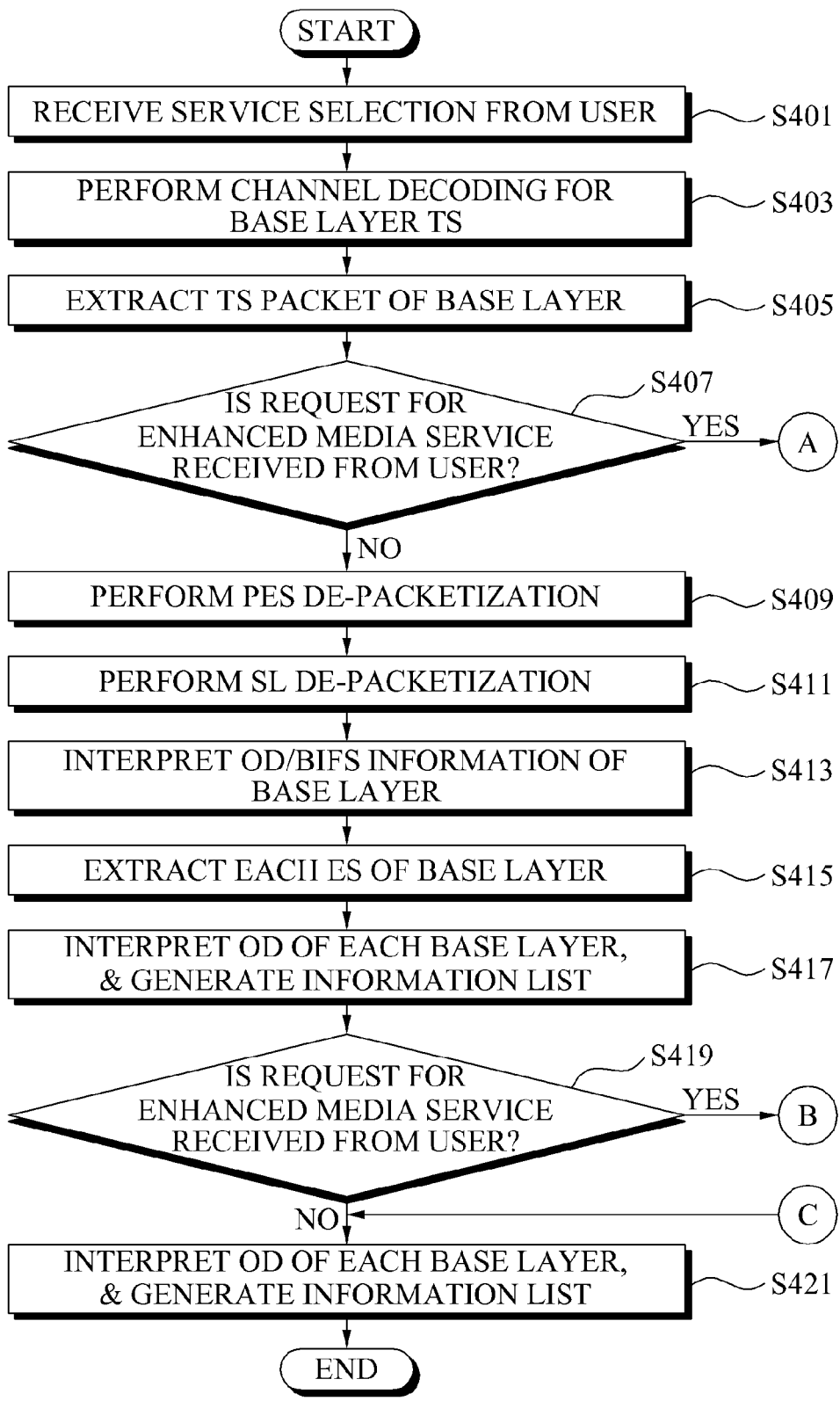

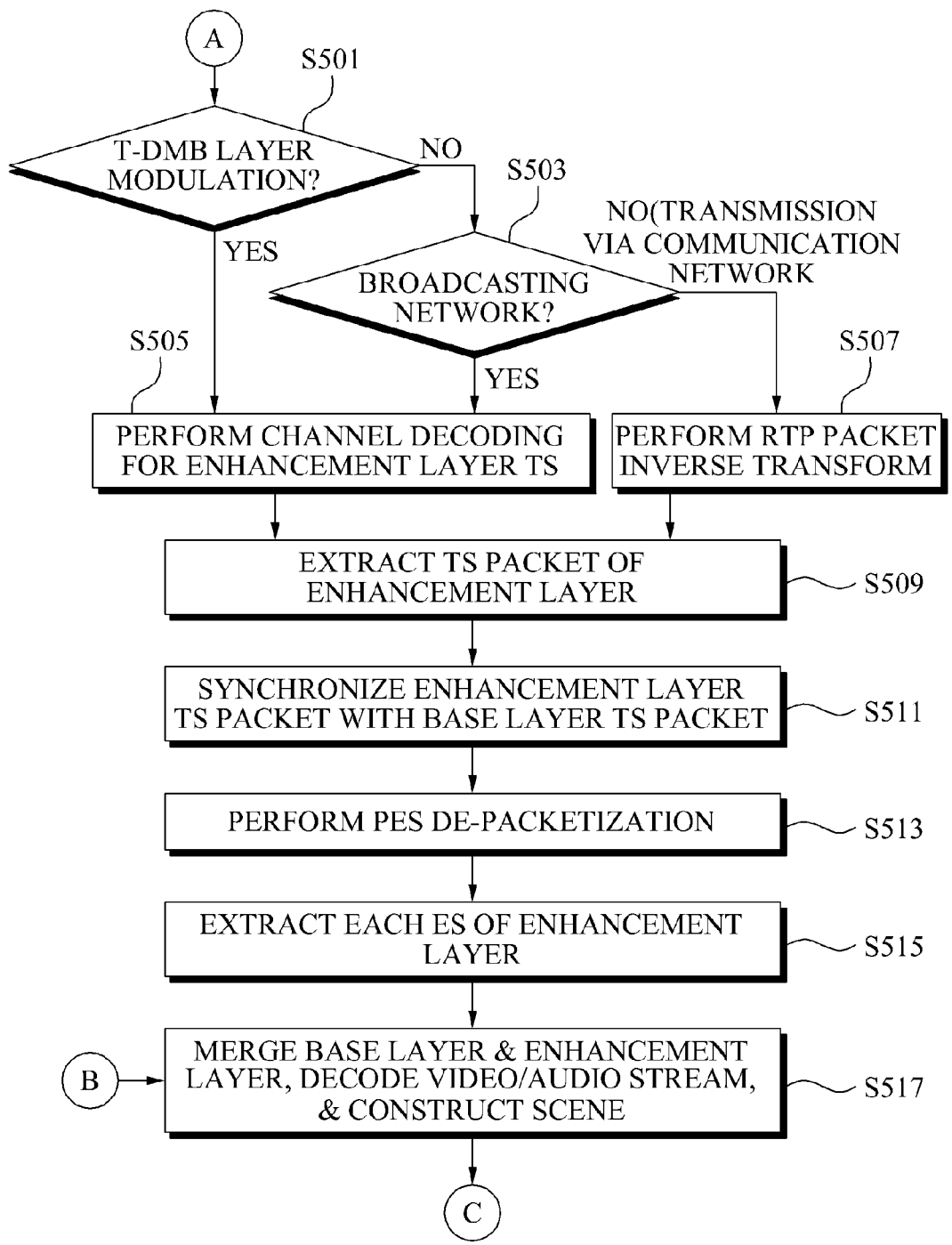
[Fig. 5]

METHOD AND APPARATUS FOR TRANSMITTING/RECEIVING ENHANCED MEDIA DATA IN DIGITAL MULTIMEDIA BROADCASTING SYSTEM

RELATED APPLICATIONS

This application is a 35 U.S.C. §371 national stage filing of PCT Application No. PCT/KR2008/005879 filed on Oct. 7, 2008, which claims priority to, and the benefit of Korean Patent Application No. 10-2007-0127383 filed on Dec. 10, 2007. The contents of the aforementioned applications are hereby incorporated by reference.

TECHNICAL FIELD

The present invention relates to a Digital Multimedia Broadcasting (DMB) system, and more particularly, to a method and apparatus for processing enhanced media data in which the enhanced media data is compressed using a scalable video coding (SVC) compression scheme and then is separated into a base layer and an enhancement layer in order to provide an enhanced video service via Terrestrial Digital Multimedia Broadcasting (T-DMB).

This work was supported by the IT R&D program of MIC/IITA. [2006-S-017-02, Development of advanced transmission technology for the terrestrial DMB system]

BACKGROUND ART

FIG. 1 is a block diagram illustrating a configuration of a media processor of a transmitter in a conventional Digital Multimedia Broadcasting (DMB) system.

As shown in FIG. 1, the media processor of the transmitter includes a media system encoding and multiplexing unit 100. The media system encoding and multiplexing unit 100 may receive a video stream from an Advanced Video Coding (AVC) video encoder 105, receive an audio stream from a Bit sliced Arithmetic Coding (BSAC) audio encoder 107, and receive additional data from an additional data provider 111, and then encode and multiplex the received video stream, the audio stream, and the additional data.

The AVC video encoder 105 encodes a video signal based on a video standard. The BSAC audio encoder 107 encodes an audio signal.

The media system encoding and multiplexing unit 100 includes an Initial Object Descriptor (IOD) generator 101, an Object Descriptor/Binary Format for Scenes (OD/BIFS) generator 103, an SL packetizer 109, a session generator 113, a Packetized Elementary Stream (PES) packetizer 115, a Transport Stream (TS) multiplexer 117, and a channel encoder 119.

The IOD generator 101 generates IOD data according to an International Organization for Standardization/International Electrotechnical commission (ISO/IEC) 14496-1 standard.

The OD/BIFS generator 103 generates an OD/BIFS stream according to the ISO/IEC 14496-1 standard.

The SL packetizer 109 generates an SL packet according to the ISO/IEC 14496-1 standard. The SL packet is a synchronization packet between media streams.

Specifically, the SL packetizer 109 receives an OD/BIFS stream, a video elementary stream, an audio elementary stream, and additional data, and then generates an OD/BIFS SL packet, a video SL packet, an audio SL packet, and an additional data SL packet, respectively.

The session generator 113 generates a Program Specific Information (PSI) session that includes IOD/OD/BIFS.

The session generator 113 may include a 14496 session packetizer (not shown) that packetizes an OD/BIFS SL packet, to 14496 session and a PSI packetizer (not shown) that generates PSI containing IOD.

The PES packetizer 115 packetizes an input SL packet into a PES according to an ISO/IEC 13818-1 standard. The TS multiplexer 117 multiplexes an input session and the PES packet to an MPEG-2 TS.

As shown in FIG. 1, in the conventional DMB system, the transmitter does not includes a configuration for providing an additional enhanced media service.

DISCLOSURE OF INVENTION

Technical Problem

An aspect of the present invention provides a method and apparatus for processing enhanced media data that can maintain an existing broadcasting network and quality using a scalable video coding (SVC) compression scheme in a Digital Multimedia Broadcasting (DMB) system, for example, a Terrestrial DMB (T-DMB) system and also can provide an additional enhanced media service.

Another aspect of the present invention also provides a method and apparatus for processing enhanced media data that can maintain compatibility with an existing DMB system and synchronize an elementary stream of an enhancement layer with an elementary stream of a base layer and also can simplify a system operation.

Technical Solution

According to an aspect of the present invention, there is provided an apparatus for processing enhanced media data, the apparatus including: a base layer processing unit configured to multiplex an elementary stream of a base layer and perform channel encoding for the multiplexed elementary stream of the base layer; an enhancement layer processing unit configured to synchronize an elementary stream of an enhancement layer with the elementary stream of the base layer and thereby multiplex the elementary stream of the enhancement layer and process the elementary stream of the enhancement layer to be transmittable via at least one of a plurality of transmission channels; and a synchronizer configured to provide the enhancement layer processing unit with synchronization information that is used for synchronizing the elementary stream of the enhancement layer with the elementary stream of the base layer.

According to another aspect of the present invention, there is provided an apparatus for processing enhanced media data, the apparatus including: a base layer processing unit configured to perform channel decoding for a base layer stream; an enhancement layer processing unit configured to receive an enhancement layer stream via the same transmission channel as a transmission channel of the base layer stream or a different transmission channel from the transmission channel of the base layer stream, perform channel decoding or packet inverse transform for the enhancement layer stream corresponding to the transmission channel, and synchronize the channel decoded enhancement layer stream or the packet inverse transformed enhancement layer stream with the base layer stream; and a synchronizer configured to provide the enhancement layer processing unit with synchronization information that is used for synchronizing the enhancement layer stream with the base layer stream.

According to still another aspect of the present invention, there is provided an apparatus for processing enhanced media data, the apparatus including: a base layer processing unit configured to perform channel decoding for a base layer stream and thereby de-multiplex the base layer stream; an enhancement layer processing unit configured to receive a packet transformed enhancement layer stream via a communication network, perform packet inverse transform for the packet transformed enhancement layer stream, and synchronize the packet inverse transformed enhancement layer stream with the base layer stream; and a synchronizer configured to provide the enhancement layer processing unit with synchronization information that is used for synchronizing the enhancement layer stream with the base layer stream.

According to yet another aspect of the present invention, there is provided a method of processing enhanced media data, the method including: packetizing an elementary stream of an enhancement layer by synchronizing the elementary stream of the enhancement layer with an elementary stream of a base layer; multiplexing the packetized elementary stream of the enhancement layer to a transport stream by synchronizing the elementary stream of the enhancement layer with the elementary stream of the base layer; performing channel encoding for the multiplexed transport stream so as to transmit the transport stream via a broadcasting network; transforming the multiplexed transport stream into an RTP packet so as to transmit the multiplexed transport stream via a communication network; and transmitting the channel encoded transport stream via the broadcasting network, or transmitting the RTP packet transformed transport stream via the communication network.

According to a further another aspect of the present invention, there is provided a method of processing enhanced media data, the method including: verifying a transmission channel of enhancement layer data when a request for an enhanced media service is received from a user; performing channel decoding for an enhancement layer transport stream when the transmission channel of the enhancement layer data is a broadcasting network; de-multiplexing the channel decoded enhancement layer transport stream by synchronizing the channel decoded enhancement layer transport stream with a base layer transport stream; and de-packetizing the de-multiplexed enhancement layer transport stream.

BRIEF DESCRIPTION OF THE DRAWINGS

FIG. 1 is a block diagram illustrating a configuration of a media processor of a transmitter in a conventional Digital Multimedia Broadcasting (DMB) system;

FIG. 2 is a block diagram illustrating a configuration of a media system encoding and multiplexing unit of a transmitter for transmitting enhanced media data according to an embodiment of the present invention;

FIG. 3 is a block diagram illustrating a configuration of a media system decoding and de-multiplexing unit of a receiver according to an embodiment of the present invention;

FIG. 4 is a method of receiving data by a receiver according to an embodiment of the present invention; and FIG. 5 is a method of receiving data by a receiver according to embodiment of the present invention.

MODE FOR THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

In the following description, a Digital Multimedia Broadcasting (DMB) system will be described based on a Terrestrial DMB (T-DMB) using a scalable video coding (SVC) compression scheme. However, the present invention is not limited thereto.

FIG. 2 is a block diagram illustrating a configuration of a media system encoding and multiplexing unit 200 in a transmitter for transmitting enhanced media data according to an embodiment of the present invention.

As shown in FIG. 2, the media system encoding and multiplexing unit 200 includes a base layer processing unit 201 that processes an elementary stream (ES) of a base layer, an enhancement layer processing unit 203 that processes an ES of an enhancement layer in the same way as the conventional scheme, and a system synchronizer 205 that synchronizes the ES of the base element and the ES of the enhancement layer.

The base layer processing unit 201 may perform the same function as the media system encoding and multiplexing unit 100. The base layer processing unit 201 may multiplex the ES of the base layer and then perform channel encoding for the multiplexed ES of the base layer.

The base layer processing unit 201 may include a T-DBM multiplexer 209 that multiplexes the ES of the base layer to output as a base layer MPEG-2 TS and a base layer channel encoder 211 that encodes the base layer MPEG-2 TS.

The enhancement layer processing unit 203 may synchronize an ES of an enhancement layer with the ES of the base layer and thereby multiplex the ES of the enhancement layer and process the ES of the enhancement layer to be transmittable via at least one of a plurality of transmission channels.

The enhancement layer processing unit 203 may include a Packetized Elementary Stream (PES) packetizer 213 that packetizes the ES of the enhancement layer to generate a packet, an enhancement layer Transport Stream (TS) multiplexer 215 that multiplexes the generated packet to a transport stream, and a transmission channel determining unit 221 that determines a transmission channel for transmitting the multiplexed transport stream.

The PES packetizer 213 may receive the ES of the enhancement layer and transform the ES of the enhancement layer into a PES packet. At the same time, the PES packetizer 213 may insert, into the generated PES packet, a time stamp such as a Presentation Time Stamp (PTS) and the like, for synchronization between the base layer and the enhancement layer. The PTS is generated by the system synchronizer 205 based on the same system clock.

According to an aspect of the present invention, the PES packet may include PTS/Decoding Time Stamp (DTS) information that is used to decode a video ES and an audio ES.

The enhancement layer TS multiplexer 215 may insert, into, the PES packet, a Program Clock Reference (PCR), so that a base layer transport stream and an enhancement layer transport stream may maintain the same time clock based on the same System Time Clock (STC) via the system synchronizer 205. Next, the enhancement layer TS multiplexer 215 may multiplex the PES packet to an enhancement layer MPEG-2 TS packet.

Therefore, according to an aspect of the present invention, the enhancement layer processing unit 203 may synchronize the ES of the enhancement layer with the ES of the base layer and then transmit the same.

According to an aspect of the present invention, depending on setting, the transmission channel determining unit 221 may determine a transmission channel of a conventional T-DMB network, a satellite DMB network, a communication network, and the like and transmit enhancement layer data via the determined transmission channel.

For this, the enhancement layer processing unit 203 may further include an enhancement layer channel encoder 217. The enhancement layer channel encoder 217 may perform channel encoding for transmitting the enhancement layer TS via a broadcasting network, based on the determination of the transmission channel determining unit 221.

Also, the enhancement layer processing unit 203 may further include a Real Time Protocol (RTP) packet transformer 219. The RTP packet transformer 219 may transform the enhancement layer TS into an RTP packet for transmission via a communication network, based on the determination of the transmission channel determining unit 221.

A Sequence Parameter Set (SPS) and a Picture Parameter Set (PPS) are needed for SVC decoding. The SPS and the PPS may be transmitted between an access unit delimiter and a primary coded picture. The SPS and the PPS may be transmitted for each Instantaneous Decoder Refresh (IDR).

According to an aspect of the present invention, a TS of an enhancement layer may be transmitted via the same transmission channel as a transmission channel of a TS of a base layer. Also, the TS of the enhancement layer may be transmitted via a satellite DMB network and a communication network.

In FIG. 2, when the TS of the enhancement layer and the TS of the base layer are transmitted via the same transmission channel, a T-DMB transmitter 207 may transmit each TS.

The system synchronizer 205 may generate PTS/DTS information corresponding to system synchronization information of MPEG-2, based on Composition Time Stamp (CTS)/DTS information of the base layer ES, and provide the generated PTS/DTS information to the enhancement layer processing unit 203.

FIG. 3 is a block diagram illustrating a configuration of a media system decoding and de-multiplexing unit 300 of a receiver according to an embodiment of the present invention.

As shown in FIG. 3, the media system decoding and de-multiplying unit 300 includes a T-DMB receiver 301 that receives a T-DMB signal, a base layer processing unit 303 that processes a base layer stream, an enhancement layer processing unit 305 that processes an enhancement layer stream, and a system synchronizer 307.

The base layer processing unit 303 may include a base layer channel decoder 309 and a T-DMB de-multiplexer 311. The base layer channel decoder 309 may receive a base layer TS via a conventional T-DMB transmission network and perform channel decoding for the base layer TS. The T-DMB de-multiplexer 311 may de-multiplex the decoded base layer TS.

The enhancement layer processing unit 305 may receive a packet transformed enhancement layer stream via a broadcasting network or a communication network, perform packet inverse transform for the received enhancement layer stream, and synchronize the packet inverse transformed enhancement layer stream with the base layer stream.

The enhancement layer processing unit 305 may include an enhancement layer channel decoder 313, an RTP packet inverse transformer 315, an enhancement layer TS de-multiplexer 317 and a PES de-packetizer 319. The enhancement layer channel decoder 313 may decode the enhancement layer stream when the transmission channel of the enhancement layer stream is a broadcasting network. The RTP packet inverse transformer 315 may perform packet inverse transform for an RTP packet when the transmission channel of the enhanced channel stream is a communication network. The enhancement layer TS de-multiplexer 317 and the PES de-packetizer 319 may de-multiplex and de-packetize an output stream of the enhancement layer channel decoder 313 or the RTP packet inverse-transformer 315.

According to an aspect of the present invention, a receiving scheme determining unit 331 may determine an output of the enhancement layer channel decoder 313 or the RTP packet inverse transformer 315 depending on setting of a user or a predetermined scheme.

According to an aspect of the present invention, the receiver may receive an enhancement layer stream via only a communication network. In this instance, the enhancement layer processing unit 305 may receive the packet transformed enhancement layer stream via the communication network and perform packet inverse transform for the received enhancement layer stream, and synchronize the packet inverse transformed enhancement layer stream with the base layer stream.

The system synchronizer 307 may function to maintain synchronization in a receiving end based on a PCR value, and stamp information including PTS and CTS. The PCR value is inserted so that a transport stream of the base layer and a transport stream of the enhancement layer may maintain the same time clock in the transmitter. PTS and CTS may correspond to the ES of the base layer and the ES of the enhancement layer, respectively.

Also, the system synchronizer 307 may function to provide the enhancement layer processing unit 305 with the PCT value and the stamp information such as PTS and CTS.

FIG. 4 is a method of receiving data by a receiver according to an embodiment of the present invention.

Referring to FIG. 4, in operation S401, the receiver may receive a service selection from a user. In operation S403, the receiver may perform channel decoding for a base layer TS. In operation S405, the receiver may extract a TS packet of the base layer. Depending on a determination result in operation S407, the receiver may perform PES de-packetization to extract a PES packet.

In operation S411, the receiver may perform SL de-packetization. In operation S413, the receiver may interpret OD/BIFS information of the base layer based on the SL packet. The SL packet may be extracted through the SL packetization. In operation S415, the receiver may extract each ES of the base layer. In operation S417, the receiver may interpret OD of each base layer and generate an information list associated with each object and ES. Depending on a determination result in operation S419, the receiver may decode a video/audio stream for each ES and construct a scene in operation S421.

FIG. 5 is a method of receiving data by a receiver according to embodiment of the present invention.

As shown in FIGS. 4 and 5, when a request for an enhanced media service is received from the user in operations S407 and S419, the receiver may determine whether a T-DMB layer is modulated in operation S501 and whether a transmission channel of enhancement layer data is a broadcasting network in operation S503. When the transmission channel is the broadcasting network, the receiver may perform channel decoding for an enhancement layer TS in operation S503.

When the transmission channel of the enhancement layer data is the broadcasting network, the receiver may inverse transform an enhancement layer RTP packet into a TS in operation S507.

In operation S509, the receiver may extract a TS packet of the enhancement layer. In operation S511, the receiver may synchronize the enhancement layer TS packet with a base layer TS packet. In operation S513, the receiver may directly perform PES de-packetization without performing SL de-packetization or interpreting OD/BIFS information, which is different from the conventional TS processing scheme. In operation S515, the receiver may extract each ES of the enhancement layer. In operation S517, the receiver may merge the ES of base layer and the ES of the enhancement layer, decode a video/audio stream, and construct a scene.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

According to the present invention, in comparison to a conventional base layer media ES, when transmitting an enhancement layer ES, it is possible to simplify a system operation, multiplexing and outputting an audio ES and a data ES. Also, it is possible to transform the ES to be transmittable via a different channel such as a T-DMB transmission network channel, a DMB network channel, a communication network channel, and the like, and thereby transmit the transformed elementary stream.

In particular, according to the present invention, additional enhanced services can be provided via a satellite DMB transmission network, a DBM transmission network, a communication network, and the like. Therefore, it is advantageous to overcome the limit of the transmission bandwidth of a conventional T-DMB transmission network and to provide an additional enhanced video service according to a user's selection in various types of terminals supporting a broadcasting communication union service.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for processing enhanced media data, the apparatus comprising:
a base layer processing unit configured to multiplex an elementary stream of a base layer and perform channel encoding for the multiplexed elementary stream of the base layer;
an enhancement layer processing unit configured to synchronize an elementary stream of an enhancement layer with the elementary stream of the base layer and thereby multiplex the elementary stream of the enhancement layer and process the elementary stream of the enhancement layer to be transmitted over a plurality of types of transmission channels; and
a synchronizer configured to provide the enhancement layer processing unit with synchronization information that is used for synchronizing the elementary stream of the enhancement layer with the elementary stream of the base layer,
wherein the elementary stream of the base layer is transmitted over a Terrestrial Digital Multimedia Broadcasting (T-DMB) transmission network after being output from the base layer processing unit and the elementary stream of the enhancement layer is transmitted over a non-T-DMB network after being output from the enhancement layer processing unit.

2. The apparatus of claim 1, wherein the enhancement layer processing unit comprises:
a packetizer configured to packetize the elementary stream of the enhancement layer and thereby generate a packet;
a multiplexer configured to multiplex the generated packet to a transport stream; and
a transmission channel determining unit configured to determine a transmission channel for transmitting the multiplexed transport stream.

3. The apparatus of claim 2, wherein the packetizer is configured to insert, into the generated packet, a time stamp for synchronization between the base layer and the enhancement layer.

4. The apparatus of claim 2, wherein the multiplexer is configured to insert a Program Clock Reference (PCR) into the multiplexed transport stream.

5. The apparatus of claim 2, further comprising:
a channel encoder configured to perform channel encoding for the transport stream based on the determination of the transmission channel determining unit, so as to transmit the transport stream to a broadcasting network; and
a packet transformer configured to transform the transport stream to a Real Time Protocol (RTP) packet based on the determination of the transmission channel determining unit, so as to transmit the transport stream to a communication network.

6. The apparatus of claim 1, wherein the synchronizer is configured to generate synchronization information to be used for the elementary stream of the enhancement layer corresponding to the elementary stream of the base layer, based on a Decoding Time Stamp (DTS) and composition of the elementary stream of the base layer.

7. An apparatus for processing enhanced media data, the apparatus comprising:
a base layer processing unit configured to perform channel decoding for a base layer stream;
an enhancement layer processing unit configured to receive an enhancement layer stream via the same transmission channel as a transmission channel of the base layer stream or a different transmission channel from the transmission channel of the base layer stream, the different transmission channel being a different type of transmission channel, perform channel decoding or packet inverse transform for the enhancement layer stream corresponding to the transmission channel, and synchronize the channel decoded enhancement layer stream or the packet inverse transformed enhancement layer stream with the base layer stream; and a synchronizer configured to provide the enhancement layer processing unit with synchronization information that is used for synchronizing the enhancement layer stream with the base layer stream, wherein the base layer stream is received over a Terrestrial Digital Multimedia Broadcasting (T-DMB) transmission network and the enhancement layer stream is received over a non-T-DMB network.

8. The apparatus of claim 7, wherein the enhancement layer processing unit comprises:
an enhancement layer channel decoder configured to decode the enhancement layer stream when the transmission channel of the enhancement layer stream is a broadcasting network;
a packet inverse transformer configured to perform packet inverse transform for an RTP packet when the transmission channel of the enhanced channel stream is a communication network; and
a de-multiplexer and a de-packetizer configured to de-multiplex and de-packetize an output stream of the enhancement layer channel decoder or the packet inverse transformer.

9. An apparatus for processing enhanced media data, the apparatus comprising:
a base layer processing unit configured to perform channel decoding for a base layer stream received over a first type of transmission channel and thereby de-multiplex the base layer stream;
an enhancement layer processing unit configured to receive a packet transformed enhancement layer stream via a communication network using a second type of transmission channel, perform packet inverse transform for the packet transformed enhancement layer stream, and synchronize the packet inverse transformed enhancement layer stream with the base layer stream; and
a synchronizer configured to provide the enhancement layer processing unit with synchronization information that is used for synchronizing the enhancement layer stream with the base layer stream,
wherein the base layer stream is received over a Terrestrial Digital Multimedia Broadcasting (T-DMB) transmission network and the enhancement layer stream is received over a non-T-DMB network.

10. The apparatus of claim 9, wherein the enhancement layer processing unit comprises:
a packet inverse transformer configured to perform packet inverse transform for the enhancement layer packet to the enhancement layer stream; and
a de-multiplexer and a de-packetizer configured to de-multiplex and de-packetize an output stream of the packet inverse transformer.

11. A method of processing enhanced media data, the method comprising:
packetizing an elementary stream of an enhancement layer by synchronizing the elementary stream of the enhancement layer with an elementary stream of a base layer;
multiplexing the packetized elementary stream of the enhancement layer to a transport stream by synchronizing the elementary stream of the enhancement layer with the elementary stream of the base layer, the base layer being transmitted over a Terrestrial Digital Multimedia Broadcasting (T-DMB) transmission network;
determining a transmission channel for the enhancement layer data and, based on the determining;
perform channel encoding for the multiplexed transport stream of the enhancement layer;
transform the multiplexed transport stream of the enhancement layer into an RTP packet; and
transmitting the channel encoded transport stream of the enhancement layer over a Terrestrial Digital Multimedia Broadcasting (T-DMB) transmission network or transmitting the RTP packet transformed transport stream over a non-T-DMB network.

12. The method of claim 11, wherein the packetizing comprises inserting, into the generated packet, a time stamp for synchronization between the base layer and the enhancement layer.

13. The method of claim 11, wherein the multiplexing comprises inserting a PCR into the multiplexed transport stream.

14. A method of processing enhanced media data, the method comprising:
verifying a transmission channel of enhancement layer data when a request for an enhanced media service is received from a user;
performing channel decoding for an enhancement layer transport stream when the transmission channel of the enhancement layer data is a broadcasting network;
de-multiplexing the channel decoded enhancement layer transport stream by synchronizing the channel decoded enhancement layer transport stream with a base layer transport stream, the base layer transport stream received over a Terrestrial Digital Multimedia Broadcasting (T-DMB) transmission network, the base layer and the enhancement layer received over different types of transmission channels; and
de-packetizing the de-multiplexed enhancement layer transport stream.

15. The method of claim 14, further comprising:
performing inverse transform for an RTP packet of the enhancement layer into a transport stream when the transmission channel of the enhancement layer data is a communication network;
de-multiplexing the inverse transformed enhancement layer transport stream by synchronizing the inverse transformed enhancement layer transport stream with a transport stream of a base layer; and
de-packetizing the de-multiplexed enhancement layer transport stream.

16. The method of claim 14, wherein the base layer transport stream is received via the broadcasting network, and the received base layer transport stream is channel decoded and de-multiplexed for the service.

* * * * *